United States Patent
Zhang et al.

(10) Patent No.: US 10,444,370 B2
(45) Date of Patent: Oct. 15, 2019

(54) SHARED BICYCLE COMPRISING AN INFRARED SENSOR

(71) Applicants: Guobiao Zhang, Corvallis, OR (US); Chuan Tang, ChengDu (CN)

(72) Inventors: Guobiao Zhang, Corvallis, OR (US); Chuan Tang, ChengDu (CN)

(73) Assignees: HangZhou HaiCun Information Technology Co., Ltd., HangZhou, ZheJiang (CN); Guobiao Zhang, Corvallis, OR (US)

( * ) Notice: Subject to any disclaimer, the term of this patent is extended or adjusted under 35 U.S.C. 154(b) by 0 days.

(21) Appl. No.: 15/965,931

(22) Filed: Apr. 29, 2018

(65) Prior Publication Data

US 2018/0313957 A1  Nov. 1, 2018

(30) Foreign Application Priority Data

Apr. 29, 2017  (CN) .......................... 2017 1 0297960

(51) Int. Cl.
*G01S 19/16* (2010.01)
*G01V 8/10* (2006.01)
*H04W 84/04* (2009.01)

(52) U.S. Cl.
CPC ............. *G01S 19/16* (2013.01); *G01V 8/10* (2013.01); *H04W 84/042* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,945,794 A * | 8/1999 | Kitamura | ............... | B62H 5/20 |
| | | | | 318/16 |
| 7,406,367 B2 | 7/2008 | Uno | | |
| 7,468,667 B2 | 12/2008 | Moffett | | |
| 9,194,955 B1 * | 11/2015 | Fahmer | ................... | G01S 19/16 |
| 9,512,649 B2 | 12/2016 | Mohamed | | |
| 2014/0238762 A1 * | 8/2014 | Berberian | ............ | G05D 1/0038 |
| | | | | 180/167 |

* cited by examiner

*Primary Examiner* — Thomas S McCormack

(57) ABSTRACT

A preferred IR-bicycle comprises an infrared (IR) sensor and non-IR electronics. The IR sensor detects a person in the proximity of the IR-bicycle (i.e. a nearby person). Once the IR sensor detects a nearby person, the non-IR electronics switches from a first mode to a second mode, wherein the power consumption in the first mode is substantially lower than that in the second mode.

20 Claims, 6 Drawing Sheets

| Operation Status \ Modes | Sleep Mode | Active Mode |
|---|---|---|
| Non-IR Electronics | NO IR detection | IR detection |
| GSM Module | OFF | ON |
| GPS Receiver | OFF | ON |

Fig. 6A

| Operation Status \ Modes | Sleep Mode | Alert Mode | Normal Mode |
|---|---|---|---|
| Non-IR Electronics | NO IR detection | IR detection | |
| | | Bicycle Locked | Bicycle Unlocked |
| GSM Module | Infrequent | Frequent | Medium |
| GPS Receiver | Infrequent | Frequent | Medium |
| Camera | OFF | ON | OFF |

Fig. 6B

SHARED BICYCLE COMPRISING AN INFRARED SENSOR

CROSS-REFERENCE TO RELATED APPLICATIONS

This application claims priorities from Chinese Patent Application No. 201710297960.2, filed Apr. 29, 2017, in the State Intellectual Property Office of the People's Republic of China (CN), the disclosure of which is incorporated herein by references in their entirety.

BACKGROUND

1. Technical Field of the Invention

The present invention relates to the field of electronics, and more particularly to a shared bicycle comprising an infrared sensor.

2. Prior Art

Shared bicycles have become a popular form of public transportation. They are intended to solve "the last kilometer" issue for commuters in which the destination is too far to walk, but too close to take a taxi. A shared bicycle comes with an electronic wheel lock and a GPS receiver. The electronic wheel lock automatically unlocks after receiving an unlock message, while the GPS receiver calculates the GPS coordinates of the bicycle from satellite signals. The shared bicycle also comprises communication electronics (e.g. a GSM module) for transferring the unlock message and the GPS coordinates with a remote server. The shared bicycle further comprises a battery. This battery is preferably rechargeable which could be powered by a solar panel mounted on the front basket or a generator installed on the rear wheel hub. During usage, a user opens a share-bicycle app on a cellular phone to locate a nearby bicycle and then scan its QR-code to open the electronic wheel lock. The emergence of shared bicycles reduces the number of taxi rides, lowers fuel consumption and has a positive impact to the environment.

A bicycle becomes an easy target for theft as it is much lighter than an electric motorcycle or an automobile. A thief would simply throw a locked bicycle into a carriage and transport it to a concealed place before disabling its wheel lock. To prevent theft like this, geo-fencing is an effective method. U.S. Pat. No. 9,194,955 issued to Fahrner et al. on Nov. 24, 2015 discloses a preferred geo-fencing method. In the geo-fencing mode, a locked bicycle continuously reports its GPS coordinates to a remote server. Once the reported GPS coordinates are outside the boundary of a pre-determined geo-fence, the bicycle is considered stolen and an alert message is sent. Because its GPS receiver and GSM module are both powered in the geo-fencing mode, even a locked bicycle would consume a fairly large current (~60 mA, including ~50 mA for the GPS receiver and ~10 mA for the GSM module).

Due to the size and weight limits, the battery used by a shared bicycle has a much smaller capacity than those used by an electric motorcycle or an automobile. Accordingly, a shared bicycle has stringent requirements on power consumption. U.S. Pat. No. 5,945,794 issued to Kitamura on Aug. 31, 1999 teaches a power-saving control device for a bicycle. The bicycle comprises a lock control circuit and a magnetic sensor. A key associated with the bicycle includes a magnet. To save power, the lock control circuit is powered down when no magnet is detected. When the key is placed in such proximity to the bicycle that the magnetic sensor detects the magnet, the lock control circuit is powered and unlocks the bicycle. As few users are willing to carry a magnet to activate a bicycle, it would be difficult for Kitamura to gain wide acceptance.

The Mobike, a shared bicycle developed by a Chinese manufacturer, uses another power-saving method. Its electronics comprises a GSM module and a GPS receiver. Because it cannot be predicted when a locked bicycle will receive an unlock message, the GSM module is always in an idle mode (with a current drain of ~7 mA) and ready to accept the unlock message. After a Mobike receives an unlock message and becomes unlocked, its GPS receiver calculates the GPS coordinates frequently (e.g. once every minute, with a substantial power drain), because the Mobike is assumed to be ridden around. To reduce the power consumption, once the Mobike is locked, its GPS receiver calculates the GPS coordinates much less frequently (e.g. once every ten minutes) or not at all (with a negligible power drain), because the Mobike is assumed to be stationary. Unfortunately, calculating the GPS coordinates infrequently or not at all would disable the anti-theft feature (e.g. the geo-fencing function) of a shared bicycle. Moreover, even though the power drain from the GPS receiver is reduced when the bicycle is locked, the GSM module still drains a substantial current. Further power saving is desired.

OBJECTS AND ADVANTAGES

It is a principle object of the present invention to conserve energy resources and enhance the quality of the environment.

It is a further object of the present invention to reduce the power consumption of a shared bicycle.

It is a further object of the present invention to prevent theft of a shared bicycle.

It is a further object of the present invention to lower the manufacturing cost of a shared bicycle.

In accordance with these and other objects of the present invention, the present invention discloses a shared bicycle comprising an infrared (IR) sensor (i.e. an IR-bicycle).

SUMMARY OF THE INVENTION

The present invention discloses a shared bicycle comprising an infrared (IR) sensor (i.e. an IR-bicycle). The IR sensor is used to detect a person in the proximity of the bicycle. Once the IR sensor detects a nearby person, the non-IR electronics in the IR-bicycle switches from a first mode to a second mode, wherein the power consumption rate in the first mode is substantially lower than that in the second mode. In one preferred mode of operation, the power to the non-IR electronics is completely cut off when the IR sensor detects no nearby person. In another preferred mode of operation, the non-IR electronics runs at a slower speed in the first mode than in the second mode, e.g. the non-IR sensor updates its output less frequently, or the non-IR transmitter transmits signals less frequently.

When the IR sensor detects no nearby person, because it is neither supposed to receive any unlock message nor in immediate danger of being stolen, the communication electronics can be put into a sleep mode. Thus, the communication electronics would consume substantially less power than that in its idle mode, i.e. the current drain is reduced from ~7 mA to ~2 mA. This is a major reason that an IR-bicycle consumes less power than a Mobike. During this period, the GPS coordinates are reported infrequently (e.g. once every ten minutes) or not at all.

After the IR sensor detects a nearby person, the IR-bicycle gets into an alert mode if it is locked. In the alter mode, both the GPS receiver and the communication electronics are activated. During this period, the GPS coordinates are reported very frequently (e.g. once every few seconds). This frequent GPS reporting is to establish a geo-fence for the IR-bicycle and prevent theft. After it is unlocked and ridden by an authorized user, the IR-bicycle is in a normal mode. During this period, the GPS coordinates are reported in a medium frequency (e.g. once every minute). With three modes of operation (including the sleep mode, the alert mode, and the active mode), the IR-bicycle achieves both goals of power-saving and anti-theft.

Accordingly, the present invention discloses a shared bicycle comprising an IR sensor (i.e. an IR-bicycle), comprising: an IR sensor for detecting a nearby person around said shared bicycle; non-IR electronics excluding any IR sensor; a battery for providing power to said IR sensor and said non-IR electronics; wherein said shared bicycle is in a first mode when said IR sensor detects no nearby person; said shared bicycle is in a second mode when said IR sensor detects a person; and, the power consumption rate is substantially lower in said first mode than in said second mode.

BRIEF DESCRIPTION OF THE DRAWINGS

FIGS. 6A-6B are tables listing the operation status of the non-IR electronics in various modes of a preferred IR-bicycle.

Figure 1:
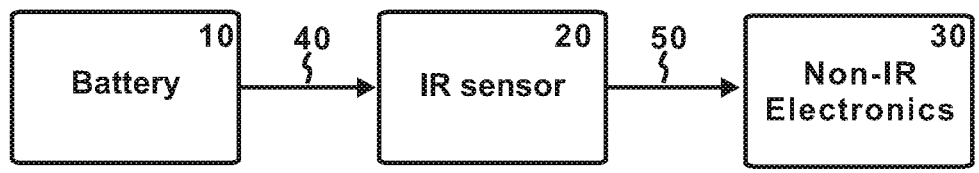
FIG. 1 is a block diagram of a preferred IR-bicycle.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

To achieve both power-saving and anti-theft, the present invention discloses a shared bicycle comprising an infrared (IR) sensor (i.e. an IR-bicycle). The IR sensor is used to detect a person in the proximity of the bicycle (i.e. a nearby person). Once the IR sensor detects a person, the non-IR electronics in the IR-bicycle switches from a first mode to a second mode, wherein the power consumption rate in the first mode is substantially lower than in the second mode.

FIG. 1 shows a typical IR-bicycle. It comprises a battery 10, an IR sensor 20 and non-IR electronics 30. The battery 10 is preferably a rechargeable battery. Exemplary rechargeable battery 10 includes nickel-metal hydride battery (NiMH), lithium-ion (Li-ion) battery, lithium-ion polymer battery (LiPo) and others. The IR sensor 20 is preferably a passive IR sensor (PIR sensor), which measures IR light radiating from objects in its field of view. The non-IR electronics 30 is electronics excluding any IR sensor. More details on the non-IR electronics 30 will be disclosed in FIGS. 2A-2B. During operation, the battery 10 provides power 40 to the IR sensor 20, whose output 50 determines the operation status of the non-IR electronics 30.

Figure 2A:
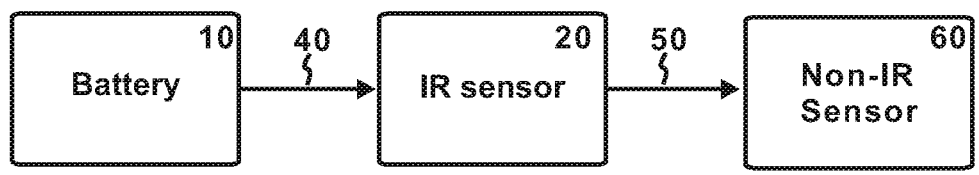
FIGS. 2A-2B show two types of the preferred non-IR electronics in a preferred IR-bicycle.
Figure 2B:
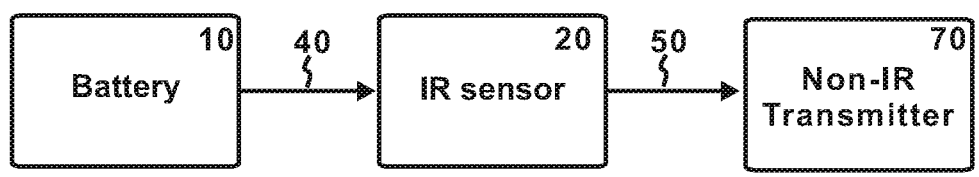

FIGS. 2A-2B show two types of the preferred non-IR electronics 30 in a preferred IR-bicycle. The non-IR electronics 30 can be categorized into non-IR sensor 60 (FIG. 2A) and non-IR transmitter 70 (FIG. 2B). The non-IR sensor 60 could be any sensor whose detecting mechanism is not based on the IR light. Examples of the non-IR sensor 60 include GPS receiver, camera, and others. The non-IR transmitter 70 could be any transmitter whose transmitting mechanism is not based on the IR light. Examples of the non-IR transmitter 70 include a cellular communication transmitter (e.g. a GSM transmitter, a GPRS transmitter, a 3G cellular transmitter, a 4G cellular transmitter, a 5G cellular transmitter) and others. It should be apparent to those skilled in the art that the non-IR electronics could also comprise a non-IR receiver, whose receiving mechanism is not based on the IR light; or, a non-IR transceiver, whose transmitting and receiving mechanisms are not based on the IR light.

Figure 3A:
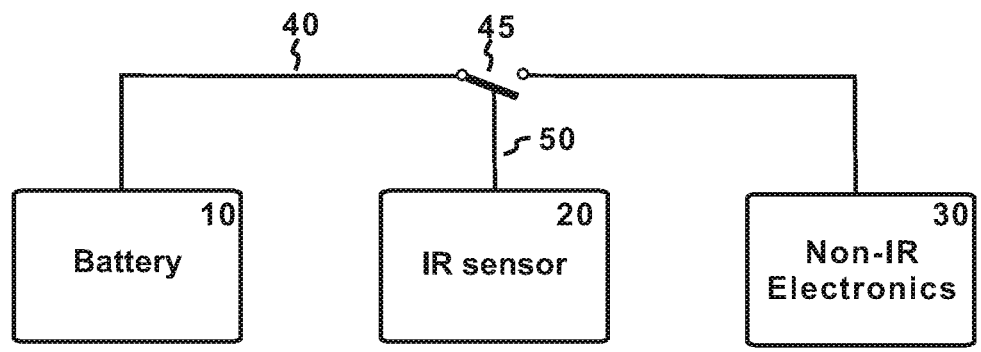
FIGS. 3A-3B are block diagrams showing two preferred power-supplying architectures.
Figure 3B:
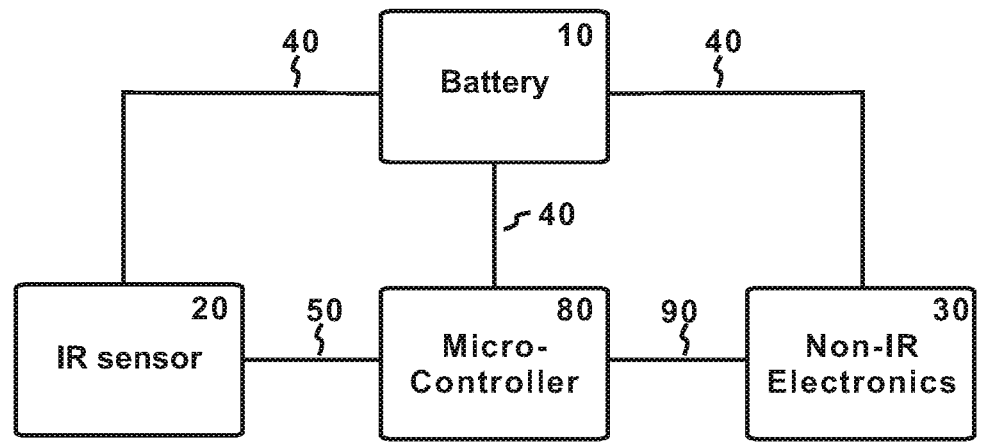

FIGS. 3A-3B show two preferred power-supplying architectures. In the preferred embodiment of FIG. 3A, the output 50 of the IR sensor 20 controls a switch 45, which cuts off the power 40 to the non-IR electronics 30 when the IR sensor 20 detects no nearby person, but turns on the power 40 to the non-IR electronics 30 after the IR sensor 20 detects a nearby person. In the preferred embodiment of FIG. 3B, the IR-bicycle further comprises a micro-controller 80. The battery 10 supplies power 40 to the IR sensor 20, the non-IR electronics 30 and the micro-controller 80. Based on the output 50 of the IR sensor 20, the micro-controller 80 sends at least one control signal 90, which determines the operation status of the non-IR electronics 30.

Figure 4A:
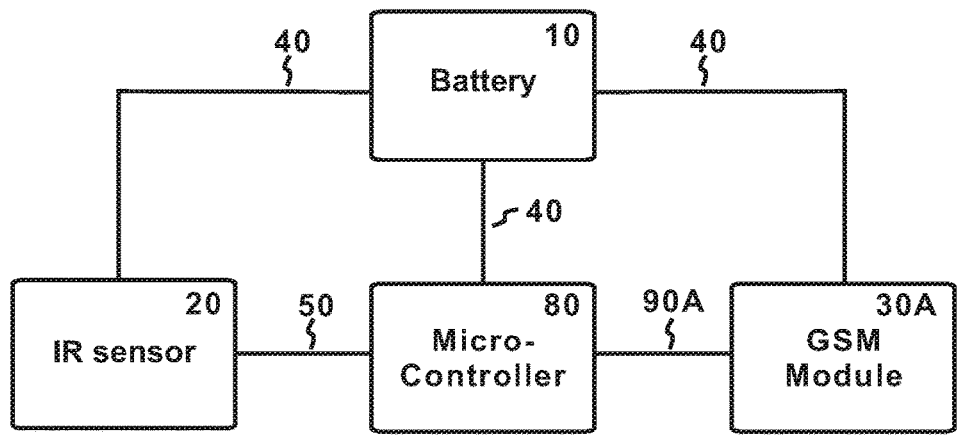
FIGS. 4A-4C show three preferred non-IR electronics used by a preferred IR-bicycle.
Figure 4B:
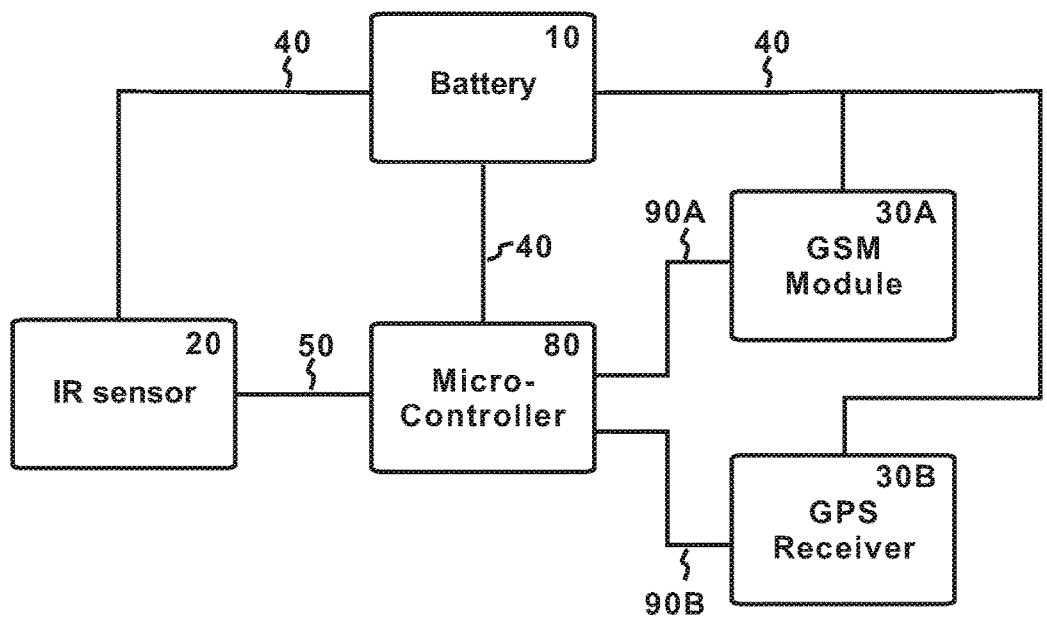
Figure 4C:
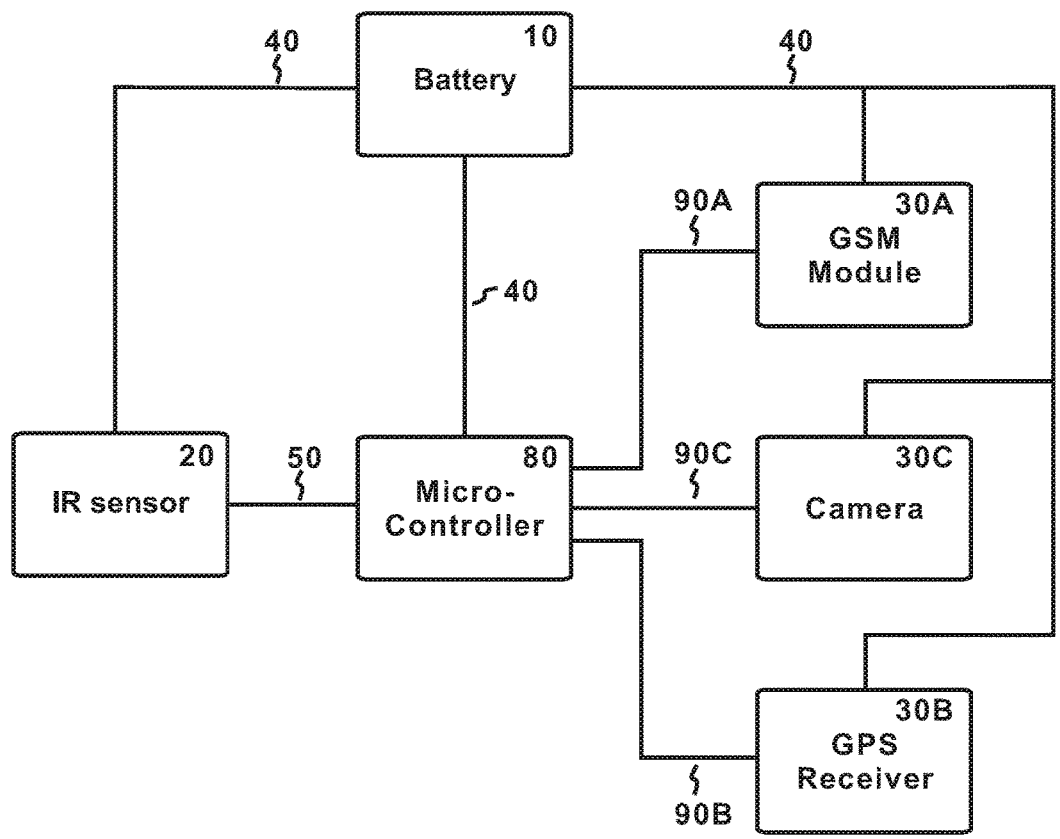

FIGS. 4A-4C show three preferred non-IR electronics used by a preferred IR-bicycle. This preferred IR-bicycle uses the power-supplying architecture of FIG. 3B. In the preferred embodiment of FIG. 4A, the non-IR electronics 30 is a GSM module 30A for cellular communication, whose operation status is determined by a first control signal 90A from the micro-controller 80. In the preferred embodiment of FIG. 4B, the non-IR electronics 30 further comprises a GPS receiver 30B for calculating the GPS coordinates, whose operation status is determined by a second control signal 90B. In the preferred embodiment of FIG. 4C, the non-IR electronics 30 further comprises a camera 30C for taking photos or videos around the bicycle, whose operation status is determined by a third control signal 90C.

Figure 5A:
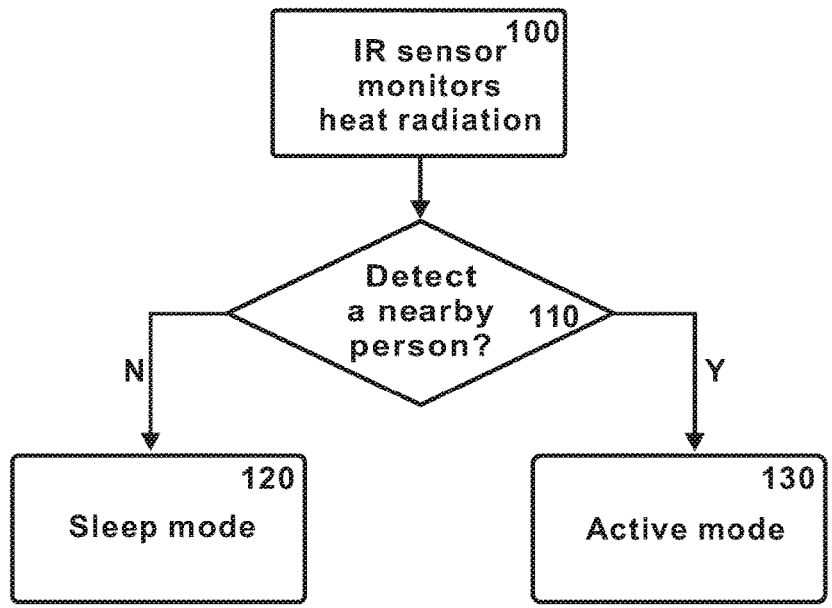
FIGS. 5A-5B are flow diagrams of two preferred powers-saving methods used by a preferred IR-bicycle.
Figure 5B:
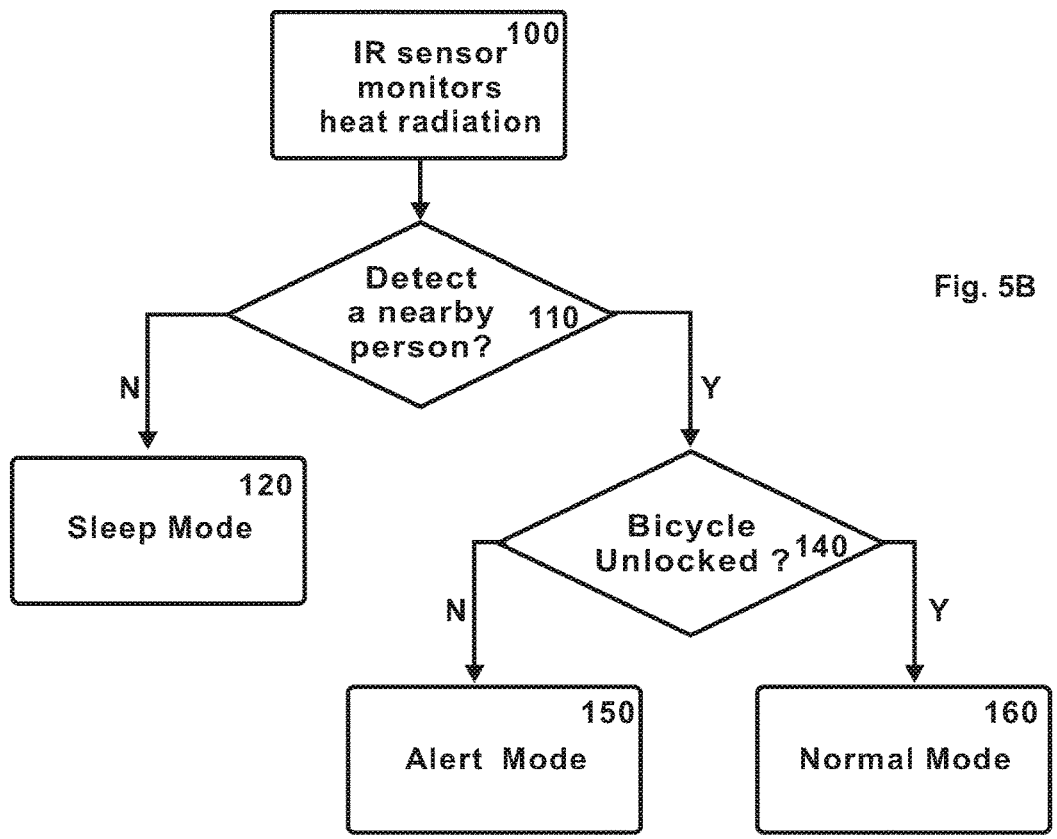

FIGS. 5A-5B are flow diagrams of two preferred powers-saving methods used by a preferred IR-bicycle. In the preferred method of FIG. 5A, the IR sensor 20 is always activated to monitor heat radiation (step 100). If no nearby person is detected (step 110), the non-IR electronics 30 is put into a sleep mode (step 120). If a nearby person is detected (step 110), at least a first portion of the non-IR electronics 30 is put into an active mode (step 130). In the preferred embodiment of FIG. 5B, another decision will be made about whether the bicycle is locked (step 140) after a nearby person is detected (step 110). If the bicycle is locked, at least a second portion of the non-IR electronics 30 is put into an alert mode (step 150); otherwise at least a third portion of the non-IR electronics 30 is put into a normal mode (step 160).

FIGS. 6A-6B are tables listing the operation status of the non-IR electronics in various modes of a preferred IR-bicycle. The preferred embodiment of FIG. 6A corresponds to the power-supplying architecture of FIG. 3A and the power-saving method of FIG. 5A. In the sleep mode, the power 40 to the GSM module 30A and the GPS receiver 30B are cut and therefore, these two non-IR electronics are turned off. In the active mode, the GSM module 30A and the GPS receiver 30B are turned on.

The preferred embodiment of FIG. 6B corresponds to the power-supplying architecture of FIG. 3B and the power-saving method of FIG. 5B. When the IR sensor 20 detects no nearby person, because the GSM module 30A is not supposed to receive any unlock message, the GSM module 30A can be put into a sleep mode, which consumes substantially less power than its idle mode (~2 mA vs. ~7 mA). During this period, the GPS receiver 30B calculates the GPS coordinates and the GSM module 30A reports the GPS coordinates infrequently (e.g. once every ten minutes) or not at all.

After the IR sensor 20 detects a nearby person, the preferred IR-bicycle is in an alert mode if it is locked. In the alter mode, both the GSM module 30A and the GPS receiver 30B are activated: the GPS receiver 30B calculates the GPS coordinates very frequently (e.g. once every few seconds) and the GSM module 30A reports the GPS coordinates also very frequently (e.g. once every few seconds). This frequent GPS reporting is to establish a geo-fence for the preferred IR-bicycle and prevent theft.

After it is unlocked and ridden by an authorized user, the preferred IR-bicycle is in a normal mode. The normal mode and the active mode are similar. During this period, the GPS receiver 30B calculates the GPS coordinates in a medium frequency (e.g. once every minute) and the GSM module 30A also reports the GPS coordinates in a medium frequency (e.g. once every minute). It should be apparent to those skilled in the art that, to further deter theft, a camera 30C can be activated and take photos or videos around the preferred IR-bicycle in the alert mode. In other modes, the camera 30C could be turned off.

Using an IR sensor to determine the likelihood for an IR-bicycle to receive an unlock message or be stolen, the GSM module can be put into a sleep mode when no person is nearby. This can substantially lower the power consumption rate. In one preferred embodiment, the current drain of its GSM module is reduced from ~7 mA to ~2 mA. With a smaller current drain, the preferred IR-bicycle may use a smaller battery, a smaller solar panel, or even no solar panel, thus achieving a lower manufacturing cost. In addition, by putting the non-IR electronics (e.g. a GPS receiver, a camera, a GSM module) into an alert mode (i.e. fully armed and operate very fast) when someone is around a locked bicycle, bicycle theft can be deterred. Overall, the present invention strikes a balance of power-saving and anti-theft, while lowers the manufacturing cost.

While illustrative embodiments have been shown and described, it would be apparent to those skilled in the art that may more modifications than that have been mentioned above are possible without departing from the inventive concepts set forth therein. The invention, therefore, is not to be limited except in the spirit of the appended claims.

What is claimed is:

1. A shared bicycle with a lock, comprising:
    an infra-red (IR) sensor for detecting a nearby person by measuring IR light radiated from said person;
    non-IR electronics excluding said IR sensor; and,
    a battery for providing power to said IR sensor and said non-IR electronics; wherein
    said shared bicycle is in a first mode when said IR sensor detects no nearby person;
    said shared bicycle is in a second mode when said IR sensor detects said nearby person and said lock unlocks said shared bicycle;
    said shared bicycle is in a third mode when said IR sensor detects said nearby person and said lock locks said shared bicycle;
    wherein the power consumption rate of said first mode is lower than the power consumption rate of said second mode; and, the power consumption rate of said second mode is lower than the power consumption rate of said third mode.

2. The shared bicycle according to claim 1, wherein said non-IR electronics is powered down in said first mode.

3. The shared bicycle according to claim 1, wherein said non-IR electronics comprises a non-IR transmitter.

4. The shared bicycle according to claim 3, wherein said non-IR transmitter comprises a cellular communication transmitter.

5. The shared bicycle according to claim 4, wherein said cellular communication transmitter transmits at a lower frequency in said first mode than in said second mode.

6. The shared bicycle according to claim 4, wherein said cellular communication transmitter transmits at a lower frequency in said first mode than in said third mode.

7. The shared bicycle according to claim 4, wherein said cellular communication transmitter transmits at a lower frequency in said second mode than in said third mode.

8. The shared bicycle according to claim 4, wherein said non-IR transmitter comprises a GSM transmitter, a GPRS transmitter, a 3G transmitter, a 4G transmitter, or a 5G transmitter.

9. The shared bicycle according to claim 1, wherein said non-IR electronics comprises a non-IR sensor.

10. The shared bicycle according to claim 9, wherein said non-IR sensor comprises a GPS receiver.

11. The shared bicycle according to claim 10, wherein said GPS receiver calculates the GPS coordinates at a lower frequency in said first mode than in said second mode.

12. The shared bicycle according to claim 10, wherein said GPS receiver calculates the GPS coordinates at a lower frequency in said first mode than in said third mode.

13. The shared bicycle according to claim 10, wherein said GPS receiver calculates the GPS coordinates at a lower frequency in said second mode than in said third mode.

14. The shared bicycle according to claim 1, further comprising a camera, wherein said camera is turned on in said third mode.

15. A shared bicycle with a lock, comprising:
    an infra-red (IR) sensor for detecting a nearby person by measuring IR light radiated from said person;
    a cellular communication transmitter; and,
    a battery for providing power to said IR sensor and said cellular communication transmitter; wherein
    said shared bicycle is in a first mode when said IR sensor detects no nearby person;
    said shared bicycle is in a second mode when said IR sensor detects said nearby person and said lock unlocks said shared bicycle;
    said shared bicycle is in a third mode when said IR sensor detects said nearby person and said lock locks said shared bicycle;
    wherein said cellular communication transmitter transmits at a lower frequency in said first mode than in said second mode; and, said cellular communication transmitter transmits at a lower frequency in said second mode than in said third mode.

16. The shared bicycle according to claim 15, further comprising a camera, wherein said camera is turned on in said third mode.

17. The shared bicycle according to claim 15, further comprising a GPS receiver.

18. A shared bicycle with a lock, comprising:
an infra-red (IR) sensor for detecting a nearby person by measuring IR light radiated from said person;
a GPS receiver; and,
a battery for providing power to said IR sensor and said cellular communication transmitter, wherein
said shared bicycle is in a first mode when said IR sensor detects no nearby person;
said shared bicycle is in a second mode when said IR sensor detects said nearby person and said lock unlocks said shared bicycle;
said shared bicycle is in a third mode when said IR sensor detects said nearby person and said lock locks said shared bicycle;
wherein said GPS receiver calculates the GPS coordinates at a lower frequency in said first mode than in said second mode; and, said GPS receiver calculates the GPS coordinates at a lower frequency in said second mode than in said third mode.

19. The shared bicycle according to claim 18, further comprising a camera, wherein said camera is turned on in said third mode.

20. The shared bicycle according to claim 18, further comprising a cellular communication transmitter.

\* \* \* \* \*